Patented Nov. 25, 1952

2,619,500

UNITED STATES PATENT OFFICE 2,619,500

BISULFITE ADDITION TO TRI-2-ETHYL-BUTYL ESTER OF ACONITIC ACID

Max E. Chiddix, Phillipsburg, and James M. Cross, Belvidere, N. J., assignors to General Aniline & Film Corporation, New York, N. Y., a corporation of Delaware No Drawing. Application September 10, 1949, Serial No. 115,105

6 Claims. (Cl. 260—481)

This invention relates to an improved process for the preparation of a bisulfite addition product of tri-2-ethylbutyl ester of aconitic acid.

Bisulfite addition products of tri-2-ethylbutyl ester of aconitic acid have been prepared previously. These prior art processes, however, have utilized ammonium bisulfite which was reacted in the presence of alcohol.

It is an object of the present invention to provide an improved process for the manufacture of a bisulfite addition product of tri-2-ethylbutyl ester of aconitic acid utilizing the less expensive sodium bisulfite in place of ammonium bisulfite.

It is a further object of the present invention to provide an improved process for the manufacture of a bisulfite addition product of tri-2-ethylbutyl ester of aconitic acid wherein no alcohol is used in the addition reaction.

It is a further object of the present invention to provide an improved process for the manufacture of a bisulfite addition product of tri-2-ethylbutyl ester of aconitic acid wherein a high yield of product is obtained in a short reaction time.

These, and other objects of the present invention, are attained by the process which comprises reacting tri-2-ethylbutyl ester of aconitate with alkali metal bisulfite. It was discovered that the rate of reaction and the yield are susceptible to differences in pH and that the range of pH giving the most effective results is from pH 5 to 7 and preferably 5.5 to 6.5. The adjustment of the pH is preferably effected by the addition of alkali metal sulfite.

The following example illustrates a preferred embodiment of the invention but it will be understood that variations and substitutions may be made within the scope of the claims.

EXAMPLE 1

720 parts by weight crude tri-2-ethylbutyl aconitate
148 parts by weight anhydrous sodium sulfite
211 parts by weight sodium bisulfite
777 parts by weight water The above charge was placed in a stainless steel stirring autoclave fitted with a 230 lb. Ashcroft Duragauge, a stainless steel thermowell, and a stainless steel blow leg. The autoclave was pressure tested with nitrogen at 70 lb., and then evacuated while at room temperature to a pressure of 70–90 mm. of mercury. Air was allowed to fill the autoclave and then evacuated as before. The valve was closed, and the charge heated with stirring at 200 R. P. M. to 160° C. (corrected thermometer reading) and 70 to 75 lb. pressure. The pressure was kept as close to a 73 lb. average as possible, and the agitation continued until a one-half cc. sample taken through the blow leg was completely soluble in one hundred cc. of distilled water. This took about three hours. When the reaction was complete, the autoclave was cooled to 60 to 80° C. and the reaction mixture discharged. The mixture was allowed to stand for one hour at 60–80° C., and the layers then separated. The upper layer weighed 1080 to 1110 g. To the upper layer was added 820 cc. water and 34 cc. of the hot lower layer. After thorough agitation, the mixture was allowed to stand five hours at room temperature. The upper layer of salt water was withdrawn and discarded. The lower layer was diluted with water to 3500 g. and had a pH of 5 to 7. This solution contained 762 parts of the addition product.

EXAMPLE 2

Charge 554 parts by weight crude tri-2-ethylbutyl aconitate
448 parts by weight 37% sodium bisulfite solution
114 parts by weight sodium sulfite
316 parts by weight water

Procedure

Same as for Example 1 except that a temperature of 105–107° C. and a pressure of 2–2.5 lbs. per sq. in. were used. The reaction time was 38.5 hours. The pH of the lower layer was 6.5 when the reaction was complete. The upper layer weighed 722 parts. To it was added 645 parts $H_2O$ and 15 parts of hot lower layer to get a good separation. The lower layer was shown by analysis for water and for sodium sulfate ash to contain 635 parts of the sodium bisulfite addition product. This is 92% of the theoretical yield of 690 parts.

EXAMPLE 3

Charge 596 parts by weight tri-2-ethylbutyl aconitate
482 parts by weight 37% sodium bisulfite solution
122 parts by weight sodium sulfite
104 parts by weight $H_2O$

Procedure

Same as for Example 1 except that a temperature of 150–152° C. and pressure of 40–45 lbs. per sq. in. were used. The reaction time was 4 hours, 20 mins. The pH of the lower layer was 6.7 at the end of the reaction. The upper layer weighed 896 parts. To it was added 670 parts H2O and 33 parts of hot lower layer. The resulting lower layer contained 664 parts of the sodium bisulfite addition product according to the water and sodium sulfate ash analysis.

EXAMPLE 4

Charge 42.6 parts by weight tri-2-ethylbutyl aconitate
19.0 parts by weight sodium meta bisulfite
8.0 parts by weight sodium sulfite
40.0 parts by weight water

Procedure

The charge was placed in a three necked round bottom flask equipped with stirrer and reflux condenser (atmospheric pressure). It was stirred rapidly and heated under slight reflux (103-107° C.) for twenty three hours. At the end of this time the reaction mixture was water soluble showing that the reaction was complete. The pH of a 1% water solution of the reaction mixture was 5.13 at the beginning of the reaction and 6.57 at the end.

The reaction may be represented as follows:

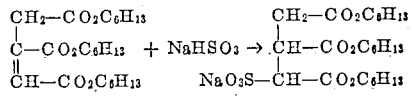

The aconitic ester used was prepared from aconitic acid, and a one-half mol excess of 2-ethylbutanol, in the presence of sulfuric acid and sodium acid sulfate. After washing and neutralizing the ester, the excess 2-ethylbutanol was distilled off, and the crude ester used as such. In removing the alcohol, the ester was heated to 180-190° C. at 10-14 mm. pressure. The reaction time for the addition of sodium bisulfite may increase as much as 50% if too much of the low boiling material is left in the ester.

The temperature of reaction may be varied over a wide range, as from 100 to 180° C., but it is preferable to operate near the higher end of the range since the rate of reaction is higher. A temperature of 160° C. is preferable.

The amount of water may be varied and amounts ranging from 20% to 100% of the aconitate have been found operable, and preferably about 60%. Stirring speed affects the rate of reaction and it is desirable to stir the reaction mixture constantly. The pressure used in the reaction may be varied but should preferably be in the range of 65-75 pounds. The pressure may be attained by heating the reaction in a closed vessel. It is desirable to run the reaction in a closed system to prevent the escape of sulphur dioxide.

The reaction cannot be made to go in any reasonable length of time, or to give a good yield of product unless the pH of the water layer of the charge is between 5 and 7 or is allowed to come into that range from a lower pH preferably through the loss of sulfur dioxide from the system.

It is possible to start with an excess of sodium bisulfite alone and generate a mixture of sodium sulfite and sodium bisulfite by heating the charge and allowing some of the SO2 to escape.

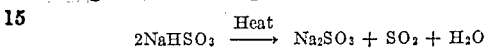

If the pH is allowed to go above 7, the yield is decreased by the saponification of the ester.

The product is very viscous at room temperature and is preferably discharged from the reaction vessel at a temperature of 50° C. or higher. A salt cake may remain in the bottom of the autoclave but it is readily removed with warm water. The product may be washed with a dilute salt solution.

What we claim is:

1. A process which comprises reacting tri-(2-ethylbutyl)-aconitate with alcohol free aqueous metal bisulfite at a temperature in the range of 100-180° C. and a pH in the range of 5 to 7, and recovering the reaction product sodium tri-(2-ethylbutyl)-sulfo-tricarballylate.

2. A process of claim 1 wherein the reaction mixture contains alkali metal sulfite.

3. A process of claim 2 wherein the pressure is in the range of 0 to 75 lbs. per sq. in.

4. A process of claim 3 wherein the alkali metal is sodium.

5. A process of claim 4 wherein the product is washed with a dilute salt solution.

6. A process of claim 4 wherein the temperature is 160° C., the pH is in the range of 5.5 to 6.5, the pressure is 75 lbs. per sq. in. and the initial reaction mixture contains 60% water based on the weight of the aconitate.

MAX E. CHIDDIX.
JAMES M. CROSS.

REFERENCES CITED

The following references are of record in the file of this patent:

UNITED STATES PATENTS

| Number | Name | Date |
|---|---|---|
| 2,315,375 | Nawiasky | Mar. 30, 1943 |